US012794326B2

(12) United States Patent
Tokuyama et al.

(10) Patent No.: US 12,794,326 B2
(45) Date of Patent: Nov. 10, 2026

(54) COIL HOLDING APPARATUS

(71) Applicant: TOYOTA JIDOSHA KABUSHIKI KAISHA, Aichi-ken (JP)

(72) Inventors: Akihiro Tokuyama, Toyota (JP); Hironari Adachi, Toyota (JP); Shuai Zhang, Toyota (JP); Masashi Kawai, Nisshin (JP); Masato Isobe, Nisshin (JP); Tomohiro Sato, Tajimi (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 702 days.

(21) Appl. No.: 18/320,205

(22) Filed: May 19, 2023

(65) Prior Publication Data

US 2023/0412056 A1 Dec. 21, 2023

(30) Foreign Application Priority Data

Jun. 15, 2022 (JP) ................................ 2022-096390

(51) Int. Cl.
*H02K 15/0421* (2025.01)

(52) U.S. Cl.
CPC ................................ *H02K 15/0421* (2013.01)

(58) Field of Classification Search
CPC ........... H02K 15/0421; H02K 15/0431; H02K 2213/03
USPC ...................... 29/446, 281.3; 248/188.4, 650
See application file for complete search history.

(56) References Cited

U.S. PATENT DOCUMENTS

| | | | | |
|---|---|---|---|---|
| 2,412,852 | A * | 12/1946 | Wood | F16F 15/067 248/573 |
| 5,660,362 | A * | 8/1997 | Selby | F16M 11/125 248/188.4 |
| 2010/0269324 | A1* | 10/2010 | Feng | B23P 11/005 29/446 |
| 2014/0175248 | A1* | 6/2014 | Fan | F16M 11/125 248/346.01 |
| 2023/0412056 | A1* | 12/2023 | Tokuyama | H02K 15/0431 |

FOREIGN PATENT DOCUMENTS

| | | | |
|---|---|---|---|
| JP | 2002-280247 | A | 9/2002 |
| JP | 2013-017266 | A | 1/2013 |
| JP | 2019-110630 | A | 7/2019 |
| JP | 2020-089108 | A | 6/2020 |

* cited by examiner

*Primary Examiner* — Minh N Trinh
(74) *Attorney, Agent, or Firm* — HAUPTMAN HAM, LLP

(57) ABSTRACT

A coil holding apparatus for laying a concentrated wound cassette coil in which a wire is laminated in multi layers, including a plurality of supporting parts configured to support the concentrated wound cassette coil, in which the plurality of the supporting parts include a first supporting part having a first height in the vertical direction and a second supporting part having a second height different from the first height in the vertical direction. The concentrated wound cassette coil includes an upper surface and a lower surface, each of the plurality of the supporting parts includes a supporting surface that is brought into contact with the lower surface and that supports the concentrated wound cassette coil.

7 Claims, 8 Drawing Sheets

COIL HOLDING APPARATUS

CROSS REFERENCE TO RELATED APPLICATIONS

This application is based upon and claims the benefit of priority from Japanese patent application No. 2022-096390, filed on Jun. 15, 2022, the disclosure of which is incorporated herein in its entirety by reference.

BACKGROUND

The present disclosure relates to a coil holding apparatus.

Japanese Unexamined Patent Application Publication No. 2013-017266 relates to a jig for supporting a coil in a process of manufacturing a concentrated wound cassette coil.

SUMMARY

A concentrated wound cassette coil is formed into a spiral shape and therefore the coil is slanted in the lamination direction of a wire. For example, when inspecting the thickness of a coil in the lamination direction of a wire, it is difficult to accurately measure the thickness due to the wire being laminated in a slanted state. In manufacturing a concentrated wound cassette coil, it is required to lay the coil without causing it to be slanted.

The present disclosure has been made to solve the problem mentioned above, and an object of the present disclosure is to provide a coil holding apparatus adapted to lay a coil without causing it to be slanted.

According to a first aspect of the present disclosure, a coil holding apparatus for laying a concentrated wound cassette coil in which a wire is laminated in multi layers, includes a plurality of supporting parts configured to support the concentrated wound cassette coil, in which the plurality of the supporting parts include a first supporting part having a first height in the vertical direction and a second supporting part having a second height different from the first height in the vertical direction.

In the aforementioned coil holding apparatus, the concentrated wound cassette coil may include an upper surface and a lower surface, each of the plurality of the supporting parts may include a supporting surface that is brought into contact with the lower surface of the concentrated wound cassette coil and that supports the concentrated wound cassette coil, and a first supporting surface of the first supporting part may be located vertically below a contact point of the upper surface which a probe for measuring a thickness of the concentrated wound coil in the vertical direction is brought into contact with.

The aforementioned coil holding apparatus may further include an adjustment mechanism configured to cause the supporting parts to move in the vertical direction so as to adjust the heights of the supporting parts in the vertical direction.

According to the present disclosure, a coil holding apparatus adapted to lay a coil without causing it to be slanted can be provided.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinbelow, specific configuration the embodiments of the present disclosure will be described with reference the drawings. The following description describes preferred embodiments of the present disclosure and the present disclosure is not to be limited to any one of the embodiments described below. Further, not all of the components/structures described in the embodiments of the present disclosure are necessarily indispensable as means for solving the problem. Note that the following description and the attached drawings are appropriately shortened and simplified where appropriate to clarify the explanation. In the figures, the identical reference symbols denote identical structural elements and the redundant explanation thereof is omitted as necessary.

Before giving descriptions of the coil holding apparatuses according to the embodiments, a coil holding apparatus according to a comparative example will be described. After explaining the problem of the coil holding apparatus according to the comparative example, the coil holding apparatuses according to the present embodiments will be described in comparison with the coil holding apparatus according to the comparative example. The coil holding apparatuses according to the present embodiments will thereby be clarified. Note that the coil holding apparatus according to the comparative example and the problem to be solved by the coil holding apparatus according to the comparative example are included in the technical idea of the embodiments of the present disclosure.

COMPARATIVE EXAMPLE

Figure 1:
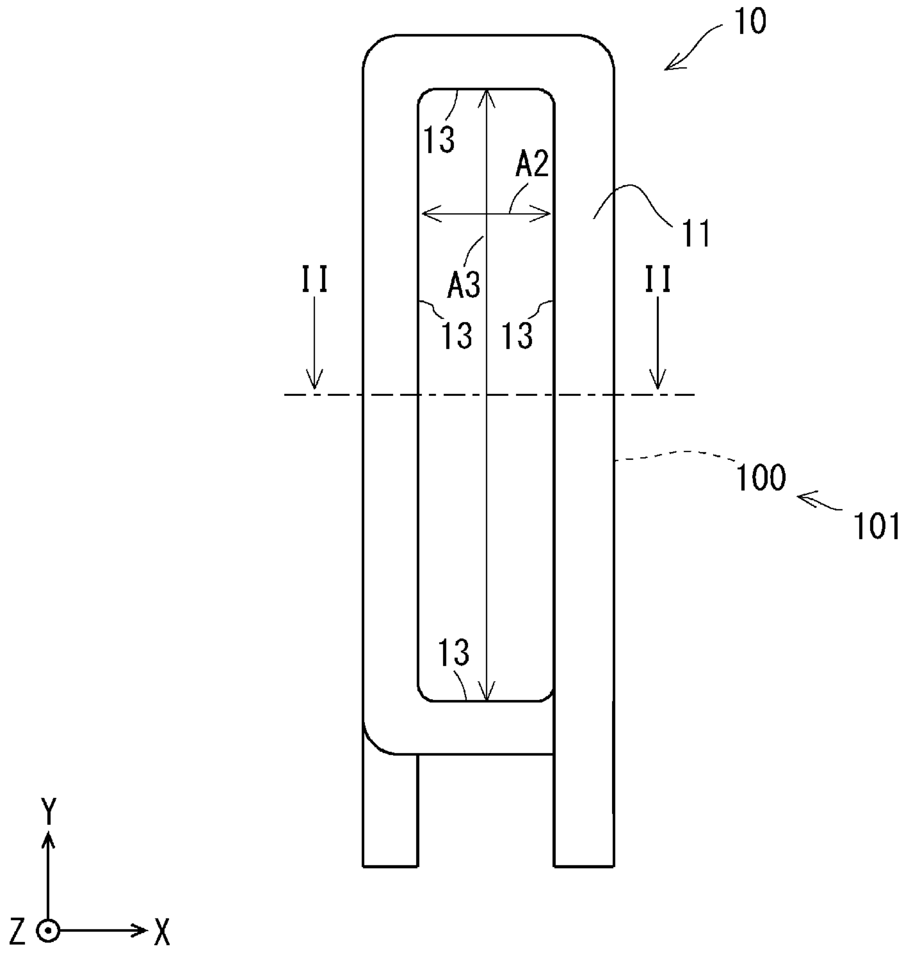
FIG. 1 is a top view illustrating a coil according to a comparative example.
Figure 2A:
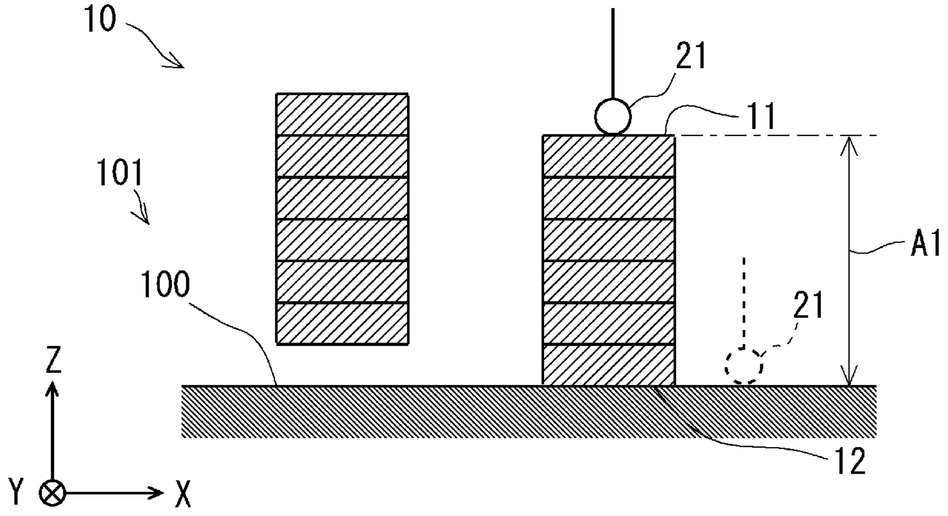
FIG. 2A is a cross-sectional view illustrating a coil holding apparatus according to the comparative example, showing a cross section of the coil holding apparatus cut along the line II-II in FIG. 1.
Figure 2B:
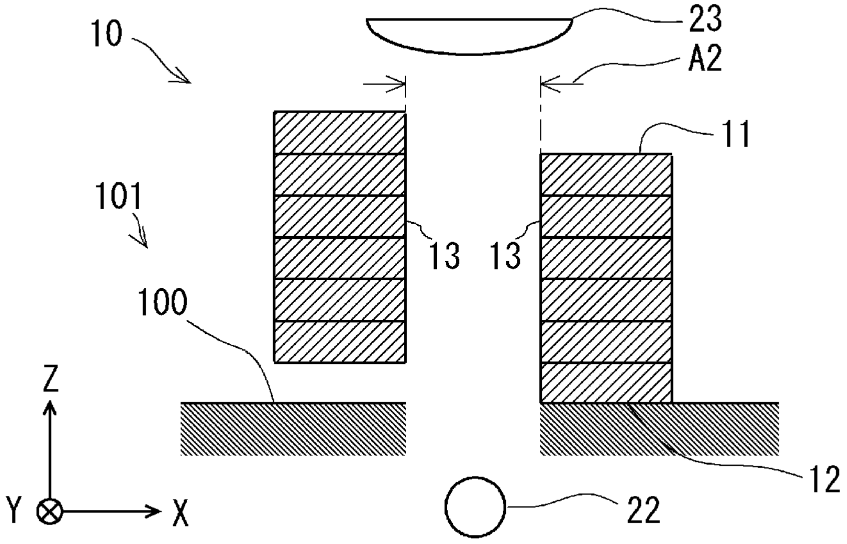
FIG. 2B is a cross-sectional view illustrating a coil holding apparatus according to the comparative example, showing a cross section of the coil holding apparatus cut along the line II-II in FIG. 1.

FIG. 1 is a top view illustrating a coil according to a comparative example. FIGS. 2*a* and 2B are cross-sectional views illustrating a coil holding apparatus according to a comparative example, showing a cross section of the coil holding apparatus cut along the line II-II in FIG. 1. As shown in FIGS. 1, 2A and 2B, a coil holding apparatus 101 according to the comparative example for holding a coil 10 includes, for example, a stage 100. The stage 100 is configured in such a way that the coil 10 is laid thereon. Therefore, the coil 10 can be laid on the stage 100. The coil 10 is one that is used in, for example, motors. Note that the usage of the coil 10 is not limited to motors.

The stage 100 has a horizontal surface. Here, for the sake of description of the coil holding apparatus 101 for holding the coil 10, an XYZ-orthogonal coordinate system is used. For example, the Z-axis direction defines the vertical direction of the coil holding apparatus and the XY-plane defines the horizontal plane of the coil holding apparatus.

The coil 10 is, for example, a concentrated wound cassette coil. The coil 10 is formed by winding a flat-type wire spirally and laminating it in multi layers (an edgewise coil). Note that the coil 10 may not be limited to that formed of a flat-type wire and may be a coil formed by winding a wire of a different type spirally and laminating it in multi layers. The coil 10 has the wire laminated in the Z-axis direction. The coil 10 may be formed by winding a flat-type wire around a central axis of the coil 10. In this case, the coil 10 is laid in such a way its central axis corresponds to the Z-axis direction. The coil 10 includes an upper surface 11 and a lower surface 12. The upper surface 11 of the coil 10 is facing the Z-axis positive direction and the lower surface 12 of the coil 10 is facing the Z-axis negative direction.

The length of the coil 10 in the lamination direction of the wire is referred to as the thickness A1. As shown in FIGS. 2A and 2B, in the case where the lamination direction of the wire is the Z-axis direction, the thickness A1 corresponds to the length of the coil in the Z-axis direction. Therefore, the thickness A1 corresponds to the length of the coil in the vertical direction. The thickness A1 corresponds to the length between the upper surface 11 and the lower surface 12 of the coil 10 in the Z-axis direction.

The intervals between the flat-type wires perpendicular to the lamination direction of the wires in the coil 10 are referred to as a width A2 and a width A3. For example, the width A2 is an interval between the flat-type wires opposing each other in the X-axis direction across the central axis of the coil 10. Therefore, the width A2 corresponds to the length between the side surfaces 13 that oppose each other in the X-axis direction. The width A3 is an interval between the flat-type wires that oppose each other in the Y-axis direction across the central axis of the coil 10. Therefore, the width A3 corresponds to the length between the side surfaces 13 that oppose each other in the Y-axis direction.

The thickness A1 of the coil 10 is measured, for example, by performing contact measurement using a probe 21. Specifically, as shown in FIG. 2A, first, the probe 21 is brought into contact with the stage 100 on which the coil 10 is laid. Accordingly, the position of the lower surface 12 of the coil 10 is measured using the probe 21. Next, the probe 21 is brought into contact with the upper surface 11 of the coil 10. Accordingly, the position of the upper surface 11 of the coil 10 is measured using the probe 21. Then, the thickness A1 of the coil 10 is measured using the probe 21 by subtracting the value expressing the position of the lower surface 12 from the value expressing the position of the upper surface 11.

The width A2 of the coil 10 is measured, for example, by performing image measurement by projection. Specifically, as shown in FIG. 2B, a light source 22 disposed at a position on the lower side of the coil 10 irradiates light onto the coil 10 from the lower side of the coil 10. The light that has passed between the side surfaces 13 the coil 10 is acquired as an image through a lens 23 disposed on the upper side of the coil 10. By measuring the distance between the side surfaces 13 of the coil 10 in the acquired image, the widths A2 and A3 of the coil 10 are measured.

Figure 3A:
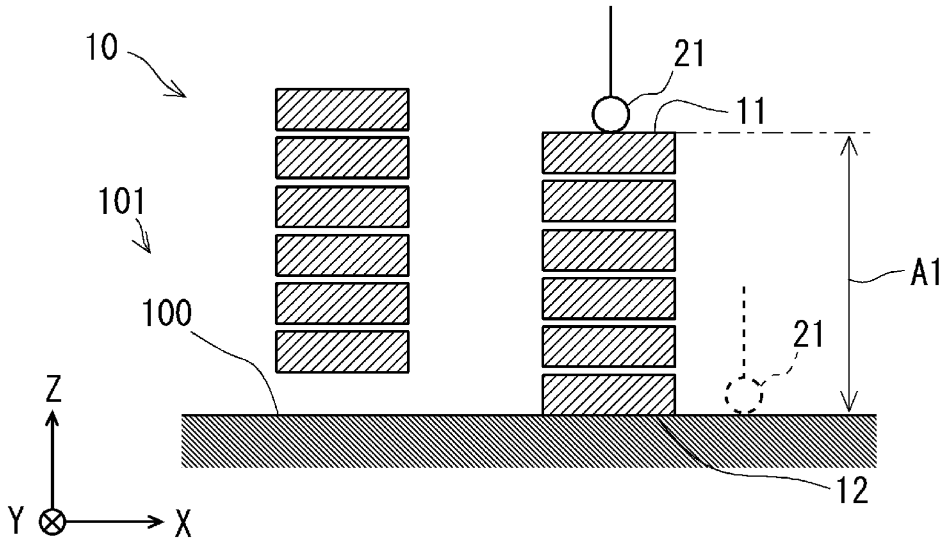
FIG. 3A is a cross-sectional view illustrating a state in which the layers of a coil are suspended in midair in performing measurement of the thickness of a coil according to a comparative example.
Figure 3B:
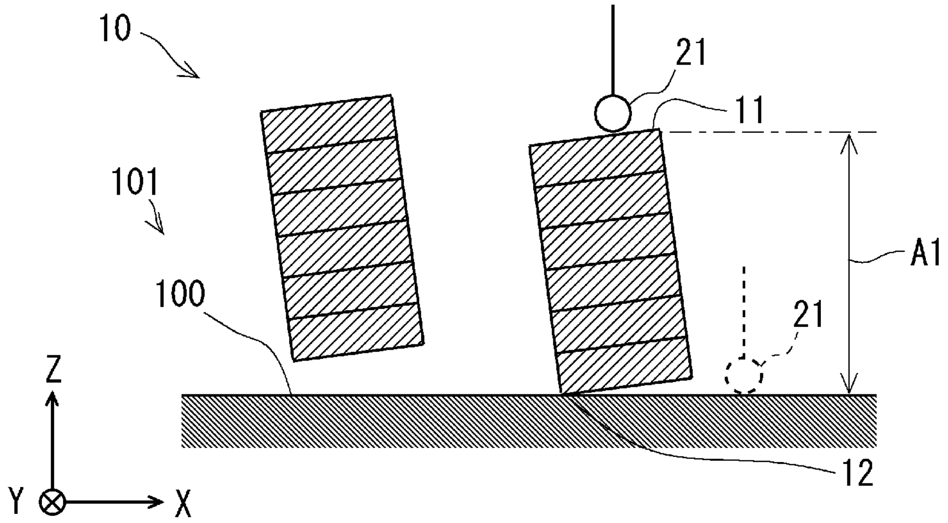
FIG. 3B is a cross-sectional view illustrating a slanted state of a coil in performing measurement of the thickness of a coil ac cording to a comparative example.

However, in the case where the coil 10 is not clamped appropriately or held in any other inappropriate manner, it is not possible to accurately measure the thickness A1. FIG. 3A is a cross-sectional view illustrating a state in which the layers of the coil 10 are suspended in midair in performing measurement of the thickness A1 of the coil 10 according to a comparative example. As shown in FIG. 3A, in a state in which the layers of the coil 10 are suspended in midair, it is not possible to accurately measure the thickness A1 of the coil 10. FIG. 3B is a cross-sectional view illustrating a slanted state of the coil 10 in performing measurement of the thickness A1 of the coil 10 according to a comparative example. As shown in FIG. 3B, in a state in which the coil 10 is in a slanted state, it is not possible to accurately measure the thickness A1 of the coil 10.

Figure 4A:
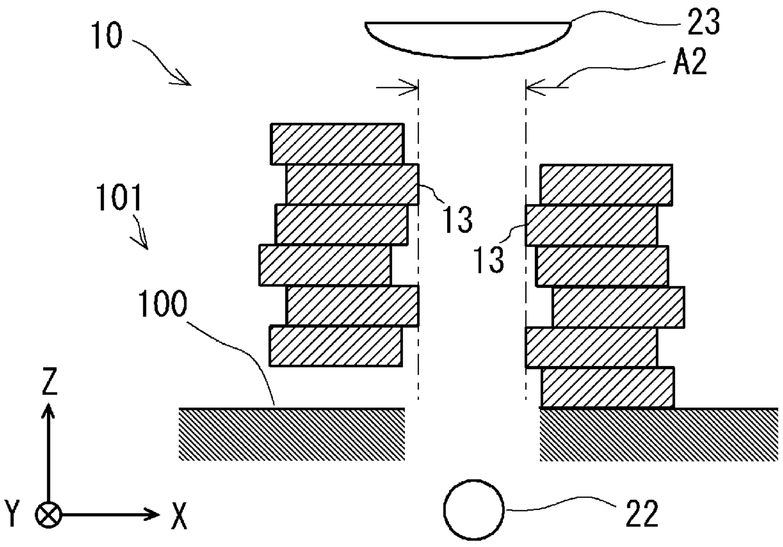
FIG. 4A is a cross-sectional view illustrating a state in which the layers of a coil are laminated out of alignment in performing measurement of the width of a coil according to a comparative example.
Figure 4B:
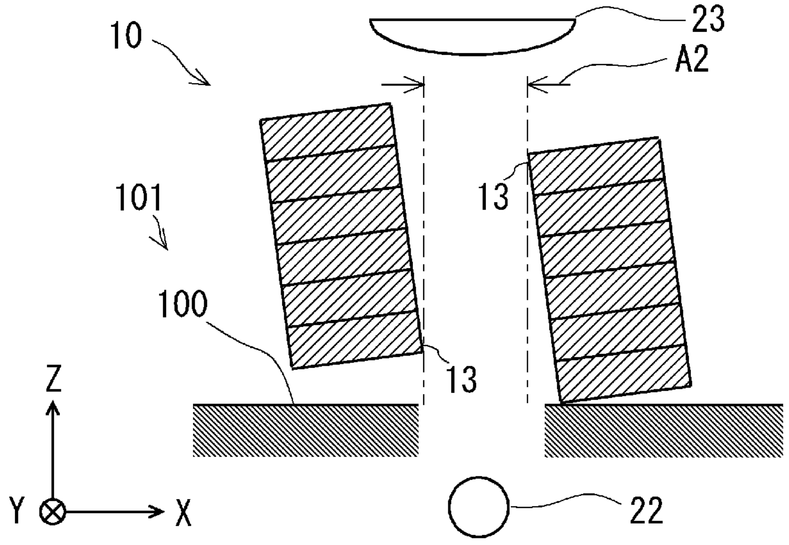
FIG. 4B is a cross-sectional view illustrating a slanted state of a coil in performing measurement of the thickness of a coil according to a comparative example.

Further, in the case where the coil 10 is not clamped appropriately or held in any other inappropriate manner, it is not possible to accurately measure the width A2 and the width A3 between the side surfaces 13 of the coil 10. FIG. 4A is a cross-sectional view illustrating a state in which the layers of the coil 10 are laminated out of alignment in performing measurement of the width A2 and the width A3 of the coil 10 according to the comparative example. As shown in FIG. 4A, in a state in which the layers of the coil 10 are laminated out of alignment, it is not possible to accurately measure the width A2 and the width A3 of the coil FIG. 4B is a cross-sectional view illustrating a slanted state of the coil 10 in performing measurement of the width A2 and the width A3 of the coil 10 according to the comparative example. When the coil 10 is in a slanted state shown in FIG. 4A, it is not possible to accurately measure the width A2 and the width A3 of the coil 10.

As a cause of occurrence of such a problem, the following problem has been found.

(I) Since the concentrated wound coil 10 is spirally formed in the Z-axis direction and therefore has no flat surface with respect to the central axis, it is slanted when laid on a flat surface.

(II) The coil 10 deforms significantly due to the clamping in the case where an aspect ratio (width/length) of a cross section of a flat-type wire is large and the rigidity of the coil is low. Specifically, the flat-type wire is soft and deforms with small force. For example, the layers of the coil 10 are suspended in midair or be out of alignment. Therefore, in the concentrated wound coil 10, in particular, in the case where (a) the demand for the product shape is high and (b) an aspect ratio (width/length) of a cross section of a flat-type wire is large and the rigidity of the coil is low, it is difficult to measure the thickness A1, the width A2, and the width A3 with high precision.

First Embodiment

Figure 5:
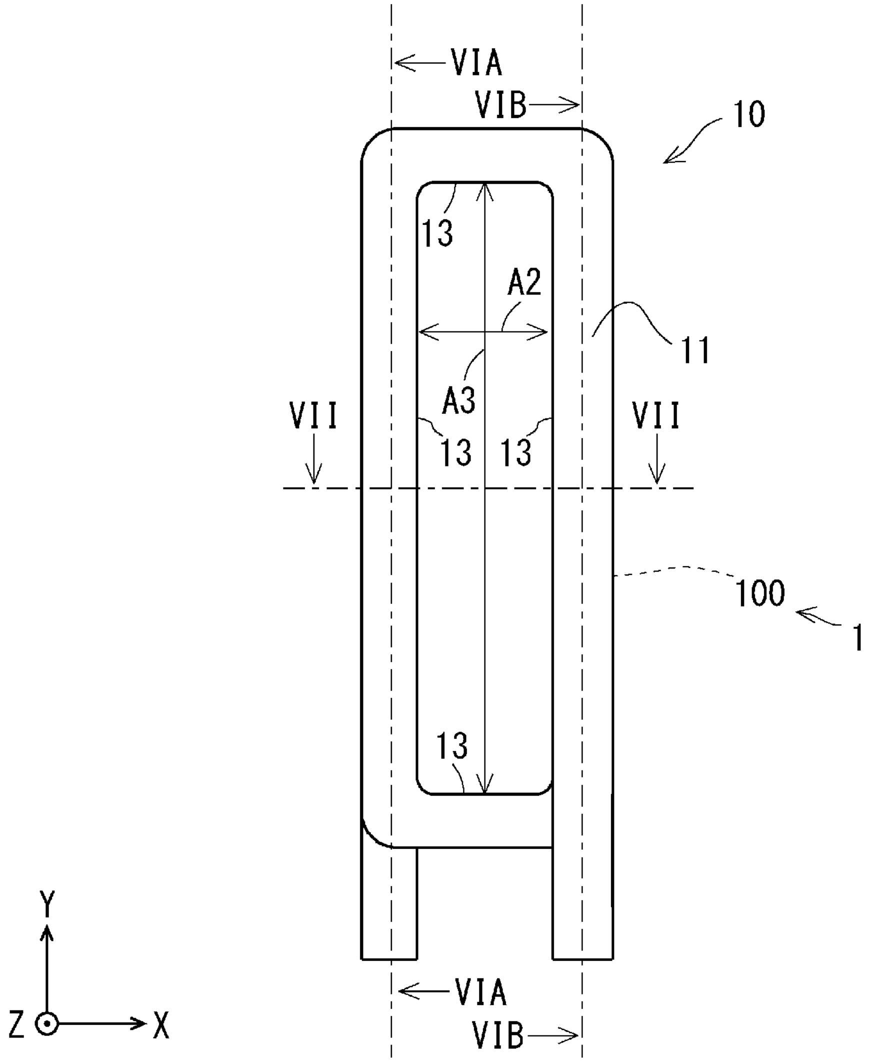
FIG. 5 is a top view illustrating a coil according to a first embodiment.
Figure 6A:
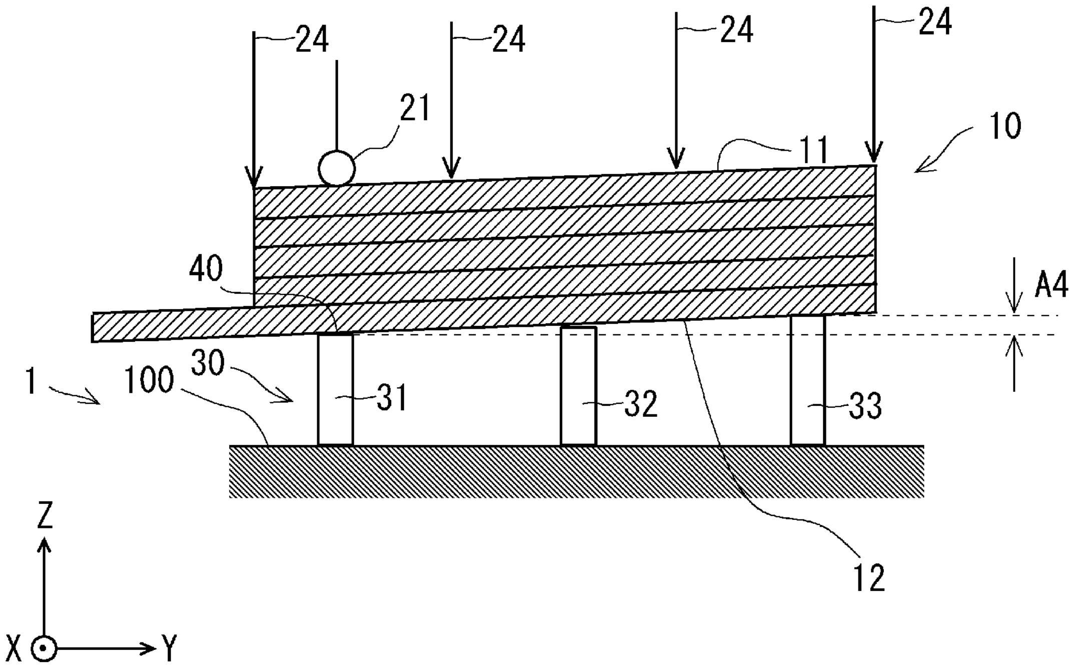
FIG. 6A is a cross-sectional view illustrating a coil holding apparatus according to the first embodiment, showing a cross section of the coil cut along the line VIA-VIA in FIG. 5.
Figure 6B:
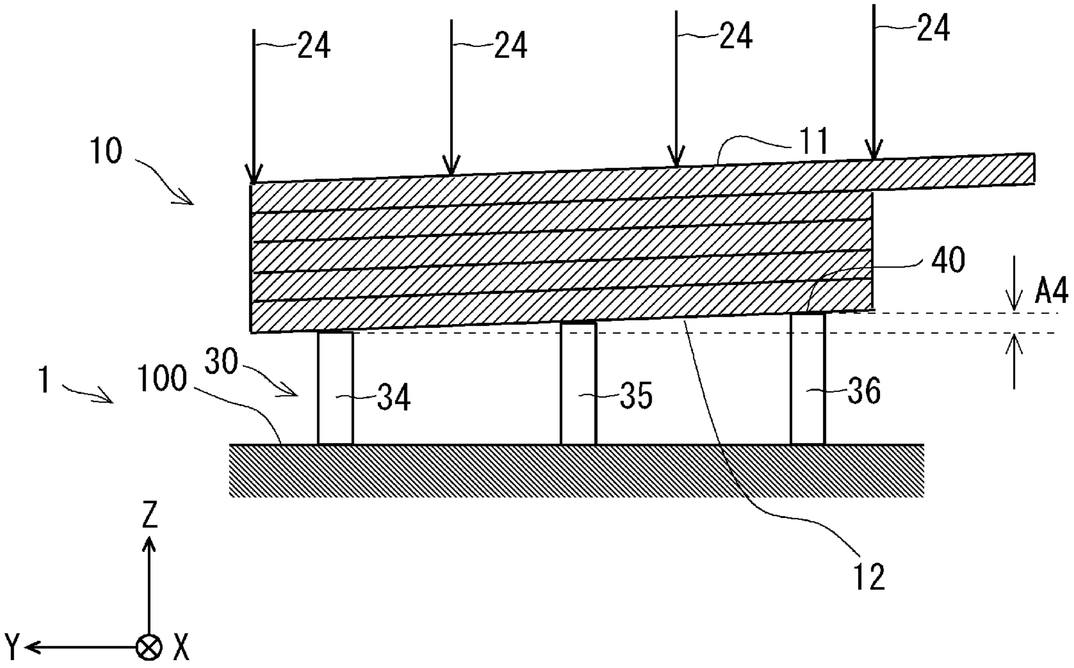
FIG. 6B is a cross-sectional view illustrating the coil holding apparatus according to the first embodiment, showing a cross section of the coil cut along the line VIB-VIB in FIG. 5.
Figure 7A:
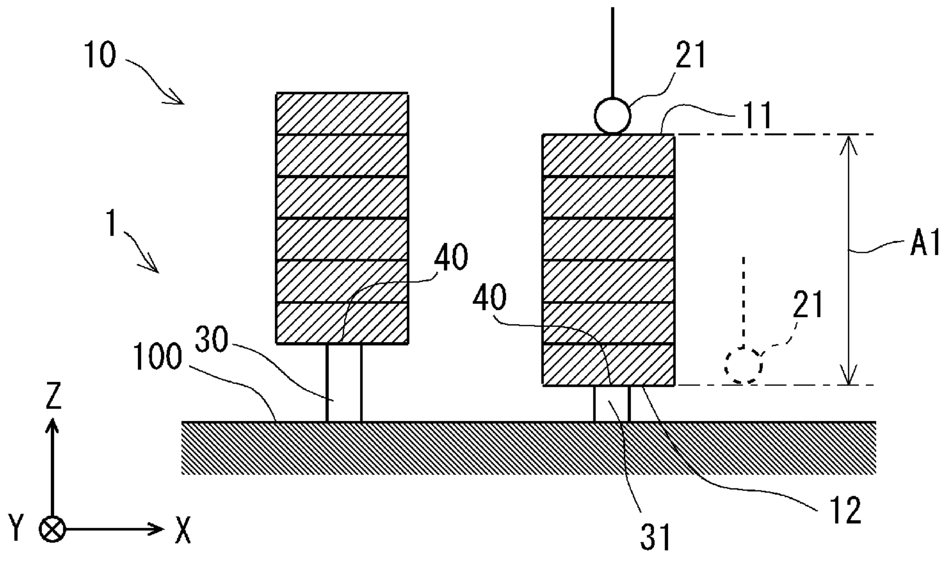
FIG. 7A is a cross-sectional view illustrating the coil holding apparatus according to the first embodiment, showing a cross section of the coil cut along the line VII-VII in FIG. 5.
Figure 7B:
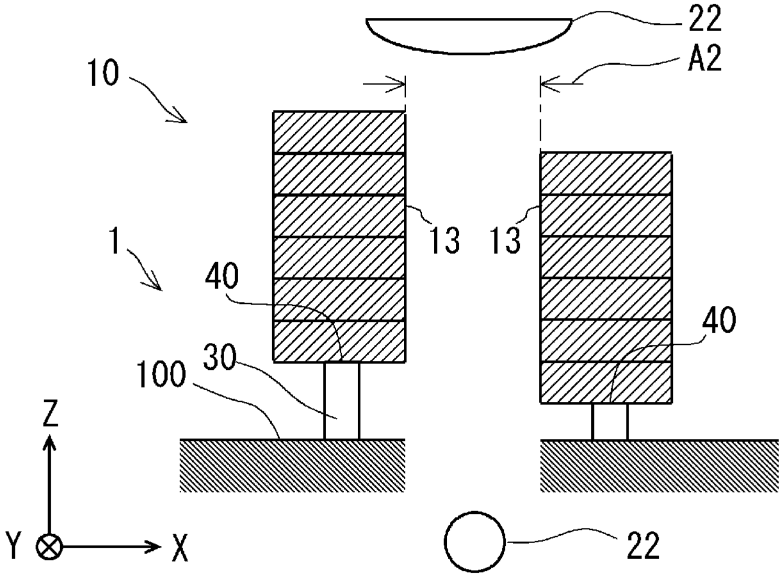
FIG. 7B is a cross-sectional view illustrating the coil holding apparatus according to the first embodiment, showing a cross section of the coil holding apparatus cut along the line VII-VII in FIG. 5.

Next, a coil holding apparatus according to a first embodiment for holding a coil 10 will be described. The coil holding apparatus according to the first embodiment for holding the coil 10 solves the aforementioned problem of the comparative example. FIG. 5 is a top view illustrating a coil according to the first embodiment. FIG. 6A is a cross-sectional view illustrating the coil holding apparatus according to the first embodiment, showing a cross section of the coil cut along the line VIA-VIA in FIG. 5. FIG. 6B is a cross-sectional view illustrating the coil holding apparatus according to the first embodiment, showing a cross section of the coil cut along the line VIB-VIB in FIG. 5. FIGS. 7A and 7B are cross-sectional views illustrating the coil holding apparatus according to the first embodiment, showing a cross section of the coil cut along the line VII-VII in FIG. 5.

As shown in FIGS. 5, 6A, 6B, 7A, and 7B, the coil holding apparatus 1 according to the first embodiment for holding the coil 10, for example, lays the concentrated wound cassette coil 10 in which a wire is laminated in multi layers. The core holding apparatus 1 includes the stage 100 and a plurality of supporting parts 30. The concentrated wound cassette coil is supported by the plurality of the supporting parts 30. The plurality of the supporting parts 30 include a supporting part 31, a supporting part 32, a supporting part 33, a supporting part 34, a supporting part 35, and a supporting part 36. The supporting parts 31 to 36 are collectively referred to as the supporting parts 30 and when a specific one of the supporting parts 30 is to be referred to, it will be referred to by its reference symbol. The number of the plurality of the supporting parts 30 to be provided is not limited to six, and can be two to five, or seven or more.

The height of the supporting part 31 in the vertical direction is referred to as a first height. The height of the supporting part 32 in the vertical direction is referred to as a second height that is different from the first height. Similarly, the heights of the supporting parts 33, 34, 35, and 36 in the vertical direction are referred to as a third, a fourth, a fifth, and a sixth heights, respectively. The plurality of the supporting parts may have different heights. Alternatively, some of the supporting parts 30 may have the same height. The plurality of the supporting parts 30 may have different heights each matching the slant of the coil 10, the difference in heights being indicated by A4 in the figures.

Each of the supporting parts 30 includes a supporting surface 40 that is brought into contact with the lower surface 12 of the coil 10 and that supports the coil 10. The supporting surface 40 is, for example, an end surface of the upper edge of each of the supporting parts 30. Note that the supporting surface 40 is not limited to an end surface of the upper edge of the supporting parts 30 as long as the coil 10 can be supported. In FIGS. 6A and 6B, for the sake of avoiding complication of the drawing, some the reference symbols are omitted.

The heights of the supporting parts 30 may be represented by the positions of the respective supporting surfaces 40 in the vertical direction. In this case, the heights of the supporting parts 30 may be represented by the positions of the respective supporting surfaces 40 in the Z-axis direction. For example, in the case where the surface of the stage 100 is horizontal, the heights of the supporting parts 30 are the lengths between the stage 100 and the respective supporting surfaces 40.

The coil 10 may be fixed by a fixing clamp 24 onto the supporting parts 30 by pressing the fixing clamp 24 from the upper side thereof in the Z-axis direction against the upper surface 11 of the coil 10. Further, the coil 10 may be fixed onto the supporting parts by pressing the fixing clamp 24 from the upper side of the coil 10 in the Z-axis direction against the upper surface 11 of the coil 10 and further pressing the fixing clamp 24 from the lower side of the coil 10 in the Z-axis direction against the lower surface 12 of the coil 10. Further, each of the supporting surfaces 40 may be clamped on both sides by a fixing clamp 24. A plurality of fixing clamps 24 may be used for the supporting.

As shown in FIGS. 6A and 7A, for example, the supporting surfaces of the supporting part 31 may be located vertically below the contact point of the upper surface 11 of the coil 10 where the probe 21 is brought into contact with. Accordingly, the thickness A1 of the coil 10 can be measured with high precision.

Figure 8:
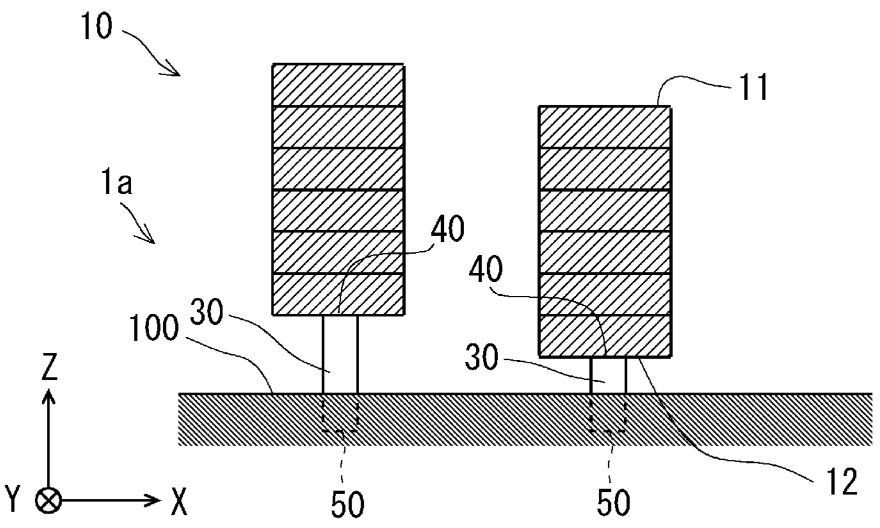
FIG. 8 is a cross-sectional view illustrating the coil holding apparatus according to another example of the first embodiment.

FIG. 8 is a cross-sectional view illustrating a coil holding apparatus 1*a* according to another example of the first embodiment for holding the coil 10. As shown in FIG. 8, the coil holding apparatus 1*a* for holding the coil 10 may include an adjustment mechanism 50 for adjusting the heights of the supporting parts 30. The adjustment mechanism 50 moves the supporting parts 30 in the vertical direction to thereby adjust the heights of the supporting parts 30.

Next, the effect of the first embodiment will be described. The core holding apparatus 1 according to the first embodiment for holding the coil 10 may have the following configurations.

(i) The heights of the supporting surfaces 40 of the plurality of supporting parts 30 are configured to match the slant of the lower surface 12 of the coil 10.

(ii) The supporting surfaces 40 are provided directly below the part-to-be-measured of the coil and each of these supporting surfaces 40 are clamped on both sides by one of the clamps.

Specifically, the coil holding apparatus 1 according to the first embodiment lays the coil 10 on the plurality of supporting parts 30 whose respective heights are configured to match the slant of the coil 10. Accordingly, the aforementioned configuration (i) is realized. Since the concentrated wound coil 10 is spirally formed in the Z-axis direction and therefore has no flat surface with respect to the central axis, it is slanted when laid on a flat surface. However, the coil holding apparatus 1 according to the first embodiment supports the coil 10 with the plurality of supporting parts 30 having different heights. Since the heights of the supporting surfaces 40 of the plurality of the supporting parts 30 can be configured to match the slant of the coil 10 without causing the coil 10 to be slanted, it is possible to lay the coil 10 without causing it to be slanted.

Further, the supporting surfaces 40 of the plurality of the supporting parts 30 are located vertically below the contact point of the upper surface 11 of the coil 10 which the probe 21 is brought into contact with. Accordingly, the aforementioned configuration (ii) is realized. In the case where an aspect ratio (width/length) of a cross section of a flat-type wire is large and the rigidity of the coil is low, the coil 10 deforms significantly due to the clamping, and thus there may be cases where the thickness A1 cannot be measured accurately. However, in the coil holding apparatus 1 according to the first embodiment, the supporting surfaces 40 are provided directly below the part-to-be-measured of the coil and each of the supporting surfaces 40 is clamped on both sides thereof by one of the clamps 24, whereby it is possible to measure the thickness A1 of even a coil 10 having a low rigidity.

As described above, according to the first embodiment, owing to the configurations (i) and (ii), it is possible to suppress slanting and deviation of the coil 10 in the XYZ-axis direction and fix the coil 10, whereby it is possible to measure the dimensions such as the thickness A1, the width A2, the width A3, and the like of even a coil 10 having low rigidity. Further, the coil can be restrained at the same posture for every measurement preformed, whereby it is possible to improve accuracy of the repetitive measurements.

Second Embodiment

Figure 9:
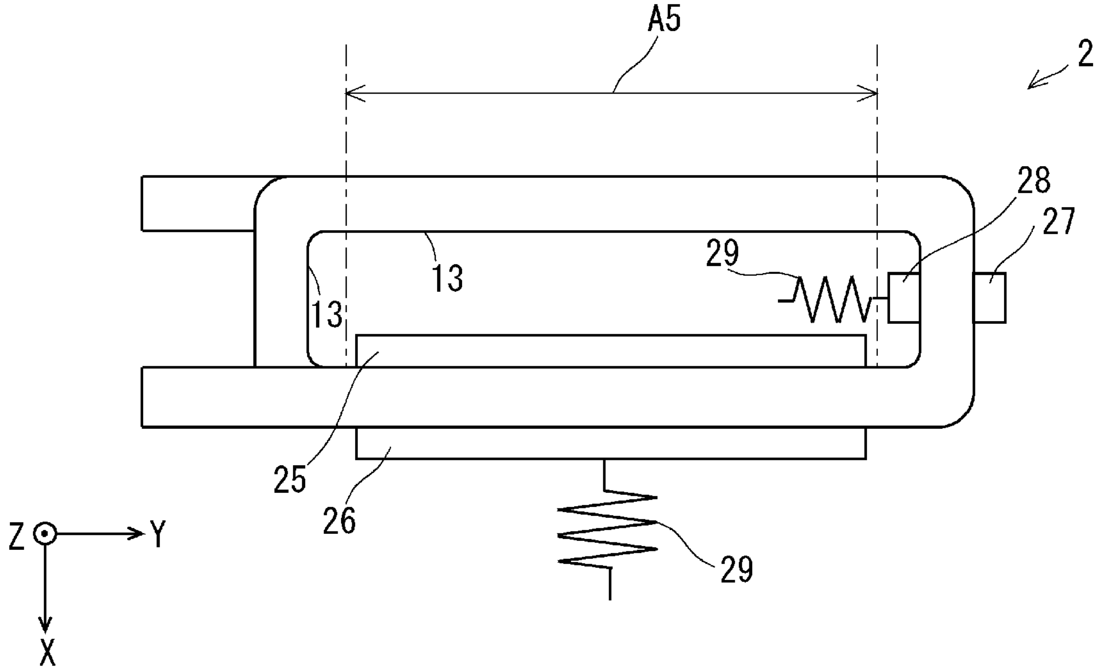
FIG. 9 is a top view illustrating a coil holding apparatus according to a second embodiment.

Next, a coil holding apparatus according to a second embodiment for holding a coil 10 will be described. The contact surface of the clamp is widened in the coil holding apparatus according to the second embodiment. FIG. 9 is a top view illustrating the coil holding apparatus according to the second embodiment. As shown in FIG. 9, the coil holding apparatus 2 according to the second embodiment for holding the coil 10 includes, in addition to the configuration of the coil holding apparatus 1 described above, an X-axis direction reference 25, an X-axis direction clamp 26, a Y-axis direction reference 27, a Y-axis direction clamp 28, and a spring 29.

Wires such as flat-type wires of the coil 10 are disposed along the X-axis direction between the X-axis direction reference 25 and the X-axis direction clamp 26. The coil 10 has a rectangular shape with the long side of the coil 10 being in the Y-axis direction and the short side of the coil 10 being in the X-axis direction when viewed in the Z-axis direction. The X-axis direction reference 25 is brought into contact with the side surface 13 on the inner side of the coil 10 and the X-direction clamp 26 is brought into contact with the side surface 13 on the outer side of the coil 10. Then, the flat-type wire is clamped by the force of the spring 29 connected to the X-axis direction clamp 26. In this case, the contact surface of the X-axis direction reference 25 and the contact surface of the X-axis direction clamp 26 between the flat-type wire are widened. Specifically, in a coil straight part A5 of the coil 10 extending in the Y-axis direction, a flat-type wire is disposed between the X-axis direction reference 25 and the X-axis direction clamp 26.

Wires such as flat-type wires of the coil 10 are disposed along the Y-axis direction between the Y-axis direction reference 27 and the Y-axis direction clamp 28. The Y-axis direction reference 27 is brought into contact with the side surface 13 on the outer side of the coil 10 and the Y-direction clamp 28 is brought into contact with the side surface 13 on the inner side of the coil 10. Then, the flat-type wire is clamped by the force of the spring 29 connected to the Y-axis direction clamp 28.

As described above, in the case where an aspect ratio (width/length) of a cross section of a flat-type wire is large and the rigidity of the coil is low, the layers of the coil 10 are prone to be out of alignment. Therefore, in order to laminate the layers of the coil 10 neatly without the layers being out of alignment, the coil straight part A5, which is the long side of the coil 10, is fixed to a large contact surface in the coil straight part A5. For example, the X-axis direction reference 25 and the X-axis direction clamp 26 clamp 80% or more of the long side of the coil as the coil straight part A5. By this configuration, slanting and deviation of the coil 10 in the XYZ-axis direction can be suppressed and the coil 10 can be fixed, whereby it is possible to measure the dimensions such as the thickness A1, the width A2, the width A3, and the like of even a coil 10 having low rigidity. The configuration and effect other that those mentioned above are described in the first embodiment.

As described above, the present disclosure has been described with the reference to the embodiments, but the present disclosure may be varied in any way without prejudice to the object and advantages of the present disclosure, and the present disclosure is not limited to the aforementioned embodiments. Further, each configuration described in the first embodiment may be combined as appropriate.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A coil holding apparatus for laying a concentrated wound cassette coil in which a wire is laminated in multi layers, the coil holding apparatus comprising:

a plurality of supporting parts configured to support the concentrated wound cassette coil, wherein the plurality of the supporting parts include a first supporting part having a first height in the vertical direction and a second supporting part having a second height different from the first height in the vertical direction, wherein the concentrated wound cassette coil includes an upper surface and a lower surface, each of the plurality of the supporting parts includes a supporting surface that is brought into contact with the lower surface of the concentrated wound cassette coil and that supports the concentrated wound cassette coil, and a first supporting surface of the first supporting part is located vertically below a contact point of the upper surface of the concentrated wound cassette coil which a probe for measuring a thickness of the concentrated wound cassette coil in the vertical direction is brought into contact with, the thickness in the vertical direction of the concentrated wound cassette coil is measured from a first position of the first supporting surface on which the concentrated wound cassette coil is seated and on which the probe is brought into contact with, and a second position of the upper surface on which the probe is brought into contact with.

2. The coil holding apparatus according to claim 1, further comprising an adjustment mechanism for causing the supporting parts to move in the vertical direction so as to adjust the heights of the supporting parts in the vertical direction.

3. The coil holding apparatus according to claim 1, wherein the thickness of the concentrated wound cassette coil in the vertical direction is measured by subtracting a value expressing the first position from a value expressing the second position.

4. The coil holding apparatus according to claim 1, wherein the concentrated wound cassette coil is fixed onto the supporting parts by a fixing clamp pressing against the upper surface of the concentrated wound cassette coil.

5. The coil holding apparatus according to claim 1, wherein the plurality of the supporting parts have different heights matching a slant of the concentrated wound cassette coil.

6. The coil holding apparatus according to claim 1, wherein the concentrated wound cassette coil comprises a flat-type wire wound spirally and laminated in multi layers.

7. The coil holding apparatus according to claim 1, wherein the coil holding apparatus further comprises a stage having a horizontal surface, and the plurality of supporting parts are disposed on the stage.

* * * * *